United States Patent Office 3,488,369
Patented Jan. 6, 1970

3,488,369
PROCESS FOR THE PRODUCTION OF HYDRO-CARBONLEAD COMPOUNDS
Kenneth C. Williams, Baton Rouge, La., assignor to Ethyl Corporation, New York, N.Y., a corporation of Virginia
No Drawing. Filed July 6, 1967, Ser. No. 651,388
Int. Cl. C07f 7/24
U.S. Cl. 260—437                                        8 Claims

ABSTRACT OF THE DISCLOSURE

A process for the production of organolead compounds, without attending free lead metal formation, by adding a tetravalent lead salt of an organic acid to a solvent solution of Grignard reagent at a temperature of from about −20° C. to about 25° C. The solvent must be more basic than diethylether.

BACKGROUND OF THE INVENTION

Commercial uses and applications for organolead compounds such as tetramethyllead and tetraethyllead are well known and many processes are known for their preparation. The most well known commercial process reacts a monosodium-lead alloy with an alkyl chloride to produce a tetraalkyllead compound with sodium chloride and free lead metal as by-products. A preferred method to prepare organolead compounds in the laboratory is to react a lead dihalide and an organo-magnesium or organo-lithium compound in ether and this reaction produces an organolead compound with a magnesium or lithium halide and free lead metal as by-products.

As can be seen from these reactions, as well as others known in the art, known chemical reactions for the production of organolead compounds carry with them the formation of free lead metal as a by-product. A process for the production of organolead compounds giving substantially complete utilization of the lead and no free lead metal by-product would be a welcome contribution to the art.

SUMMARY

In accordance with this invention, there has been discovered a process for the production of an organolead compound without the production of free lead metal comprising, in combination, the sequential steps of, (a) preparing a solution from a Grignard reagent represented by the formula RMgX, wherein R is a hydrocarbon radical having from 1 to about 20 carbon atoms and X is a halogen, and a solvent more basic than diethylether; (b) adjusting the temperature of the prepared solution to from about −20° C. to about 25° C.; (c) adding a tetravalent lead salt of an organic acid to the temperature adjusted solution to form a reaction mixture; and (d) recovering the organolead compound from said reaction mixture.

DESCRIPTION OF PREFERRED EMBODIMENTS

In accordance with the process of this invention, the Grignard reagent may be prepared in any manner well known in the art, and any Grignard reagent represented by the formula RMgX, wherein R is a hydrocarbon radical having from 1 to about 20 carbon atoms and X is a halogen, may be used. The hydrocarbon radical R may be an alkyl, aryl, alkaryl, or aralkyl and may be saturated or unsaturated; and may have from 1 to about about 20 carbon atoms or more if desired. Alkyl radicals having from 1 to 4 carbon atoms are preferred. If desired, mixtures of Grignard reagents having different hydrocarbon radicals and halogens may be used within the scope of this invention to produce mixtures of organolead compounds or organolead compounds having mixed hydrocarbon radicals.

Although the Grignard reagent may be prepared in any manner well known in the art, generally Grignard reagents are prepared in solvent solution, and in accordance with this invention, these reagents may be prepared in solvent solution and used as prepared provided the solvent used for the preparation is more basic than diethylether. Solvents more basic than diethylether encompass a large group and tetrahydrofuran and glycolic ethers such as dimethoxyethane, dimethylcarbitol, and monoethyl ether of diethylene glycol meet this requirement with tetrahydrofuran being the preferred solvent for the process of this invention. The concentration of the Grignard reagent in the solvent solution and the quantity of solvent used are not critical. It is necessary only that a sufficient volume of solution be provided for the reaction medium.

After preparation of the solvent solution of Grignard reagent, the temperature of the solution should be adjusted to from about −20° C. to about 25° C. before the addition of a tetravalent lead salt of an organic acid for reaction. A preferred range of temperatures for the solvent solution of Grignard reagent is from about 0° C. to about 10° C.

After the solvent solution temperature has been adjusted to one within the desired range, then the tetravalent lead salt of an organic acid may be added for reaction. Any of a large group of tetravalent lead salts of lower carboxylic acids may be used such as lead tetraacetate, lead tetrapropionate, lead tetrabutyrate, lead tetrabenzoate and others as well as mixtures of salts with lead tetraacetate being preferred because of its availability. The ratio of Grignard reagent to salt is not critical and stoichiometric excesses of either reactant may be used is desired. Generally, it is preferred to provide the Grignard reagent in a slight excess to insure complete utilization of the lead in the salt. During and after addition of the tetravalent lead salt of an organic acid to the solvent solution of Grignard reagent, suitable mixing or stirring may be provided if desired, and the tetravalent lead salt may be added to the solvent solution incrementally if desired.

Following the addition of the lead salt, the resultant reaction mixture may be permitted to come to ambient temperature if desired for ease in handling and subsequent separation. When an excess of Grignard reagent is used, it is preferred to hydrolyze the residual Grignard reagent in the reaction mixture with dilute hydrochloric acid or other means before recovery of the desired organolead product.

Suitable separation means may be employed to separate the organolead product from the reaction mixture as is well known in the art, and when a reagent such as dilute hydrochloric acid is used to hydrolyze any excess Grignard reagent, the resulting organic layer may be recovered as the organolead product. If desired, the resulting aqueous layer may be extracted with suitable solvent for recovery of residual portions of organolead compounds which may be contained therein.

The following examples are offered to aid in the understanding of the invention and are not intended to limit the scope of the invention in any manner whatsoever.

EXAMPLE I

Methylmagnesium chloride was prepared from 6.0 g. of magnesium metal and an equivalent amount of methyl chloride in 200 ml. of tetrahydrofuran (THF). The solution was then cooled to +5° C. in an ice bath and 22.2 g.

of lead tetraacetate added over a 20 minute period. The ice bath was then removed and stirring was continued at ambient temperature for 15 minutes. The excess Grignard was hydrolyzed and the organic layer yielded 11.78 g. (89 percent conversion) of tetramethyllead. No lead metal was formed in the reaction mixture.

EXAMPLE II

Ethylmagnesium chloride was prepared from 8.0 g. of magnesium metal and an equivalent amount of ethyl chloride in 200 ml. of THF. The solution was then cooled to +5° C. in an ice bath and 22.2 g. of lead tetraacetate was added over a 40 minute period. The ice bath was then removed and stirring was continued at ambient temperature for 15 minutes. The reaction mixture was hydrolyzed and the THF layer was separated. The aqueous layer was then extracted several times with THF. The combined THF extracts were distilled and 14.5 g. (90 percent yield) of a tetraethylead was obtained. No free lead metal was formed in the reaction.

EXAMPLE III

When Example II was repeated and the product organic layer was diluted to volume in a volumetric flask, the organic lead content, as determined by titration, was 15.11 g. (94 percent yield) and no lead metal was observed.

EXAMPLE IV

When Example II was repeated with all conditions and reactants the same except that diethylether was used as the solvent, a yield of tetraethyllead of 12½ percent was obtained and free lead metal was observed as a black precipitate.

EXAMPLE V

A Grignard solution was prepared from 5.0 g. of magnesium metal and 22.0 g. of neopentyl chloride in 300 ml. of THF. The Grignard solution was cooled to +5° C. in an ice bath and 22.2 g. of lead tetraacetate was added over a 30 minute period. The ice bath was removed and the greenish-brown solution was stirred at ambient temperature for 15 minutes. The solution was hydrolyzed and the THF was removed by distillation. The yellow solid which floated on the aqueous layer was extracted into petroleum ether (B.P. 37–54° C.), and evaporation of the ether yielded 21 g. (59 percent conversion) of hexaneopentyldilead. No lead metal was formed in the reaction.

What is claimed is:
1. A process for the production of an hydrocarbonlead compound without the production of lead metal comprising, in combination, the sequential steps of,
 (a) preparing a solution from a Grignard reagent represented by the formula RMgX, wherein R is a hydrocarbon radical having from 1 to about 20 carbon atoms and X is a halogen, and an ether more basic than diethylether;
 (b) adjusting the temperature of the prepared solution to from about −20° C. to about 25° C.;
 (c) adding a tetravalent lead salt of lower carboxylic acid to the temperature adjusted solution to form a reaction mixture; and
 (d) recovering the hydrocarbonlead compound from said reaction mixture.
2. The process of claim 1 further characterized by said ether being tetrahydrofuran.
3. The process of claim 1 further characterized by said temperature being from about 0° C. to about 10° C.
4. The process of claim 1 further characterized by said hydrocarbon radical being methyl.
5. The process of claim 1 further characterized by said hydrocarbon radical being ethyl.
6. The process of claim 1 further characterized by said salt being lead tetraacetate.
7. The process of claim 1 further characterized by said reaction mixture being permitted to come to ambient temperature before recovering said hydrocarbonlead compound.
8. The process of claim 1 further characterized by said reaction mixture being hydrolyzed to remove excess of said Grignard reagent before recovering said hydrocarbonlead compound.

References Cited

UNITED STATES PATENTS

| | | | |
|---|---|---|---|
| 2,838,508 | 5/1958 | Ramsden | 260—346.1 XR |
| 2,859,231 | 11/1958 | Blitzer et al. | 260—437 |
| 2,859,232 | 11/1958 | Blitzer et al. | 260—437 |
| 2,872,471 | 2/1959 | Ramsden | 260—665 XR |
| 2,955,124 | 10/1960 | Blitzer et al. | 260—437 |
| 2,959,596 | 11/1960 | Ramsden | 260—345.1 |
| 3,071,607 | 1/1963 | Juenge | 260—437 |
| 3,083,242 | 3/1963 | Ramsden | 260—665 |
| 3,156,716 | 11/1964 | Ramsden | 260—437 |

OSCAR R. VERTIZ, Primary Examiner

H. M. S. SNEED, Assistant Examiner